United States Patent [19]

Furukawa

[11] Patent Number: 4,667,233

[45] Date of Patent: May 19, 1987

[54] APPARATUS FOR DISCRIMINATING A MOVING REGION AND A STATIONARY REGION IN A VIDEO SIGNAL

[75] Inventor: Akihiro Furukawa, Tokyo, Japan

[73] Assignee: NEC Corporation, Japan

[21] Appl. No.: 777,033

[22] Filed: Sep. 17, 1985

[30] Foreign Application Priority Data

Sep. 17, 1984 [JP] Japan ............................ 59-194110
Dec. 12, 1984 [JP] Japan ............................ 59-262038

[51] Int. Cl.$^4$ ............................................. H04N 7/12
[52] U.S. Cl. ..................................... 358/136; 358/105
[58] Field of Search ................ 358/140, 105, 11, 135, 358/136

[56] References Cited

U.S. PATENT DOCUMENTS

| | | | |
|---|---|---|---|
| 4,240,101 | 12/1980 | Michael | 358/11 |
| 4,322,750 | 3/1982 | Lord | 358/140 |
| 4,383,272 | 5/1983 | Netravali | 358/105 |
| 4,494,144 | 1/1985 | Brown | 358/105 |
| 4,543,607 | 9/1985 | Taylor | 358/140 |
| 4,551,753 | 11/1985 | Nishizawa | 358/140 |
| 4,590,607 | 5/1986 | Kauth | 358/105 |

*Primary Examiner*—Howard W. Britton
*Attorney, Agent, or Firm*—Ostrolenk, Faber, Gerb & Soffen

[57] ABSTRACT

An apparatus for discriminating a region that contains motion from a region that does not contain motion in a video signal, particularly for use in an inter-frame predictive coding apparatus. The apparatus bridges across different portions of a moving region or of a stationary region to avoid small isolated regions of either type that would cause spurious responses by the encoding circuit and a resulting degradation of picture quality. The apparatus determines for each picture element a frame difference, which is the brightness difference for that picture element from one frame to the next. The picture elements are divided into a predetermined plurality of blocks. Then a first evaluation value is produced by an adder (14, 14'), which may be alternatively the sum of the absolute values of the frame differences in each block, or the number of picture elements within each block for which the absolute value of the frame difference is greater than a predetermined threshold. In certain embodiments (FIGS. 4 and 5), a comparator (15, 15') determines whether the first evaluation value exceeds a predetermined threshold, and in response outputs a first moving/stationary region signal. The first moving/stationary region signal is stored in a memory (22) and processed by a decision circuit (23) which generates a final moving/stationary region signal which has been compensated to eliminate errors due to noise. The compensation by the decision circuit can follow either of two alternative methods, namely, spatial correlation between a block and the neighboring blocks; or time correlation between the status of a given block at particular points in time. The final moving/stationary region information signal employed to control an encoding circuit. In other embodiments (FIGS. 10 and 11) the first evaluation value is weighted by weighting factors to produce a second evaluation value. The weighting is based on the first evaluation values of blocks that are close to the given block either in time sequence or in location.

10 Claims, 13 Drawing Figures

FIG. 6a.

| $A_1$ | $A_2$ | $A_3$ |
|---|---|---|
| $A_8$ | $A_0$ | $A_4$ |
| $A_7$ | $A_6$ | $A_5$ |

FIG. 6b.

| 1 | 1 | 1 |
|---|---|---|
| 0 | 0 | 1 |
| 0 | 1 | 1 |

FIG. 6c.

| 0 | 0 | 0 |
|---|---|---|
| 0 | 1 | 0 |
| 0 | 0 | 0 |

FIG. 7.

| | $A_0$ | $A_1$ | $A_2$ | $A_3$ | $A_4$ | $A_5$ | $A_6$ | $A_7$ | $A_8$ | OUT |
|---|---|---|---|---|---|---|---|---|---|---|
|       | 0 | 0 | 0 | 0 | 0 | 0 | 0 | 0 | 0 | 0 |
| $P_1 - 0$ | 1 | 1 | 1 | 1 | 1 | 1 | 0 | 0 |  | 1 |
| $P_2 - 1$ | 0 | 0 | 0 | 0 | 0 | 0 | 0 | 0 |  | 0 |

_FIG. 8._

| | | | | | | | | | | |
|---|---|---|---|---|---|---|---|---|---|---|
| | 160 | 240 | 200 | 220 | 240 | 240 | 260 | 190 | | |
| | 160 | 200 | 240 | 190 | 220 | 200 | 240 | 180 | | |
| | 180 | 230 | 170 | 240 | 260 | 180 | 200 | 300 | 250 | 180 |
| | 160 | 240 | 300 | 350 | 300 | 280 | 280 | 260 | 190 | |

_FIG. 9._

| | | | | | | | |
|---|---|---|---|---|---|---|---|
| 210 | 215 | 220 | 235 | 245 | 238 | | |
| 200 | 218 | 210 | 208 | 215 | 215 | | |
| 203 | 203 | 228 | 235 | 205 | 220 | 263 | 245 |
| 235 | 298 | 325 | 308 | 285 | 275 | 248 | |

APPARATUS FOR DISCRIMINATING A MOVING REGION AND A STATIONARY REGION IN A VIDEO SIGNAL

BACKGROUND OF THE INVENTION

The present invention relates to an apparatus which discriminates a moving region that contains motion from a stationary region that does not contain motion in a video signal such as a television signal, and more particularly, to such apparatus employed in an interframe predictive coding apparatus.

The apparatus for discriminating the moving region from the stationary region is used, for example, for a predictive encoding apparatus for a video signal. That is, in the predictive encoding apparatus, the input video signal is divided into the moving region containing motion and the stationary region not containing motion. Then, different encoding methods or different quantization characteristics are applied to the moving region and the stationary region, respectively, in order to suppress as much as possible of the video data to be transmitted to a receiving side, subject to the condition that the decoded video signal on the receiving side must still be adequate for practical use.

In a conventional method for discriminating the moving region from the stationary region in the video signal, a frame-to-frames amplitude (hereinafter frame difference) differences with respect to each picture elements in a picture screen is calculated, and the moving region is determined by gathering picture elements for which the absolute values of the frame differences are greater than a threshold value.

Or, in another conventional method, when a significant picture element, which has an absolute value of the frame difference greater than a threshold value, exists close to another significant picture element within a predetermined distance on the same scanning line, all picture elements within the predetermined distance are regarded as the significant picture elements and, then, the moving portion is determined by a set of such significant picture elements. Such method is disclosed in the Bell System Technical Journal, "Transmitting Television as clusters of Frame to Frame Differences", Vol. 50, No. 6, pp. 1889-1919, July-August, 1971.

According to these conventional methods, however, a picture element in the stationary region is frequently mis-detected (detected erroneously) as being a significant picture element when a brightness level in the video signal changes due to jittering in sampling pulses, or when a large amount of noise is contained in the video signal. Therefore, such mis-detection makes it difficult to correctly separate the moving region from the stationary region. The noise contained in the video signal can be considered as having an amplitude that changes nearly in a random fashion. According to the conventional methods in which a signal level of each picture element is compared with a threshold value, a picture element having a large amplitude of noise is inevitably mis-detected to be a significant picture element. Conversely, if the threshold value is increased for preventing mis-detection, a picture element having a small amplitude change can not be detected as a significant picture element.

It has also been attempted to break down the picture into blocks and detect whether each given block is a moving region or a stationary region. Each block is defined to contain a plurality of picture elements in the horizontal direction and a plurality of lines in the vertical direction. In this case, the frame differences of all picture elements in each of the blocks may be added, and the added result is compared with a predetermined threshold value. When the added result is greater than the threshold value, the block is determined to be the moving region. Alternatively, the number of significant elements in each block may be counted and, then, compared with a threshold number. In this case, when the number of the significant picture elements in the block is greater than the threshold, the block is determined to be a moving region.

However, even when the moving region and the stationary region are detected with respect to blocks, particular blocks are often mis-detected due to noise or jitter. This causes problems in predictive encoding apparatus for a video signal, since in general, particular sampling and sub-sampling methods as well as different quantization characteristics are selectively employed in the moving region and the stationary region so as to suppress as small an amount of video data as possible. Therefore, if the moving and stationary regions are mis-detected, a switching operation between different sampling methods or between different quantization characteristics may occur frequently, and the visual characteristics of the picture will be considerably degraded where such switching operation occurs.

SUMMARY OF THE INVENTION

An object of the present invention is to provide an apparatus for discriminating a moving region and a stationary region in a video signal correctly, which eliminates the above-mentioned defects of the prior art.

According to the present invention, there is provided an apparatus for discriminating a moving region and a stationary region in a video signal, comprising: means for delaying an input video signal; means for calculating differences between brightness amplitude values for each of the picture elements at spatially corresponding positions in the delayed video signal and the input video signal; means for computing a first value for each of a plurality of blocks in response to the calculated differences, the blocks being previously defined on a picture screen; and means for determining whether each block is a moving region or a stationary region by either taking a correlation of the first values of the blocks surrounding such block, or by taking a time transition correlation of the first value of such block.

BRIEF DESCRIPTION OF THE DRAWINGS

FIGS. 6(a)-(c) and 7 are diagrams for explaining a decision circuit in the first and second embodiments;

FIG. 8 is a diagram showing an example of an arrangement of first evaluation values on the picture screen according to the present invention;

FIG. 9 is a diagram showing an example of an arrangement of second evaluation values according to the present invention, which corresponds to FIG. 8;

DESCRIPTION OF THE PREFERRED EMBODIMENTS

Figure 1:
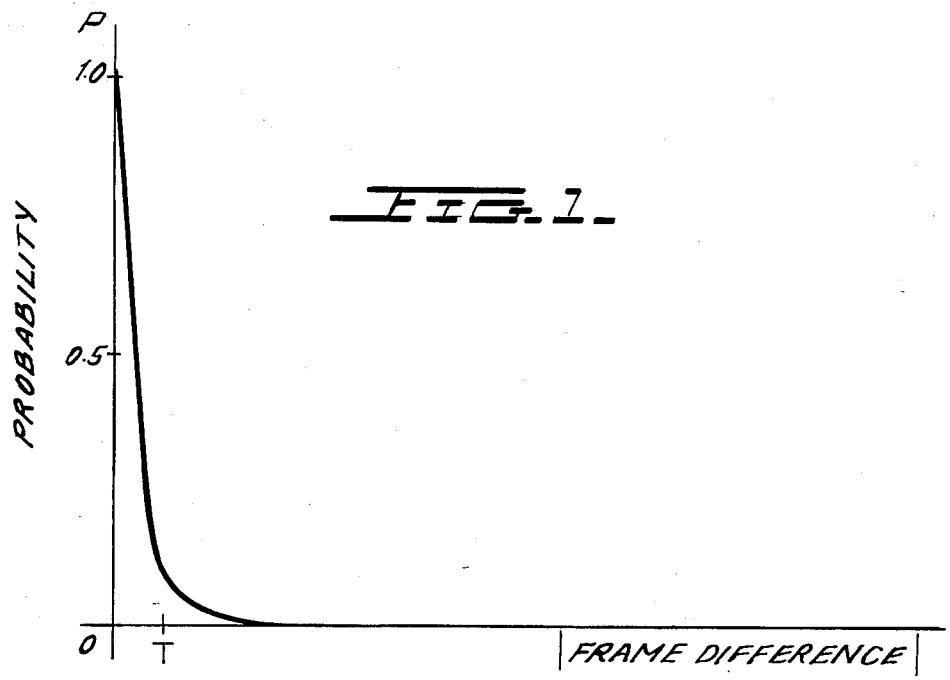
FIG. 1 is a diagram showing a relationship between the magnitude of an absolute value of a frame difference versus the probability of that magnitude occurring.

According to the present invention, first, it is assumed that an absolute value of a frame difference is calculated for each picture element. FIG. 1 is a diagram showing a relationship between the magnitude of the absolute value of a frame difference and an appearing probability thereof; that is, a probability of the occurrence thereof. As shown in FIG. 1, it can be recognized that the frame differences are generally concentrated in the vicinity of zero, and the appearing probability decreases linearly in response to an increase of the absolute value, making it difficult to distinguish a frame difference caused by noise from a frame difference caused by a brightness level change which is derived from motion. According to the above-mentioned conventional methods, a picture element having a frame difference greater than a threshold value (T in FIG. 1) is regarded as a significant picture element, and it is impossible to remove the influence of noise having a value greater than the threshold value T.

However, it has been observed that noise is generated in a nearly random fashion over the whole picture. Therefore, if the frame difference is integrated over a given region, the sum of absolute values of frame differences caused by the noise assumes a nearly constant value irrespective of the position in the region.

Figure 2:
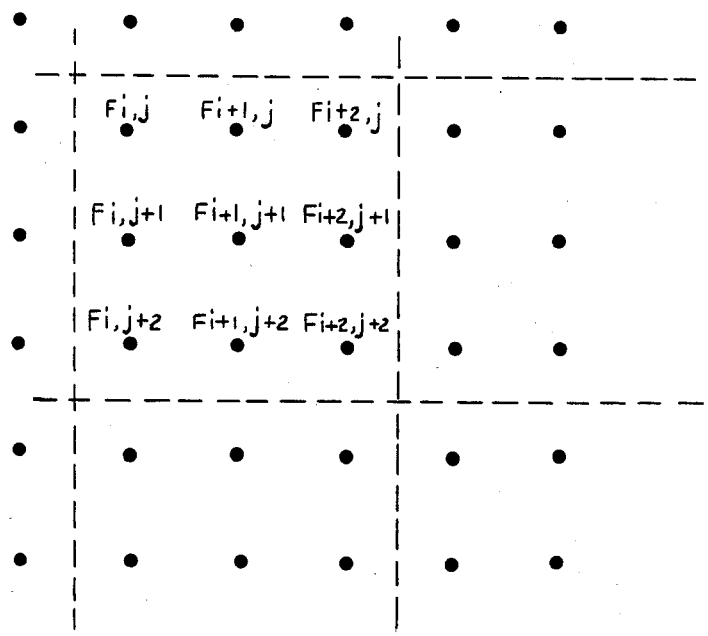
FIG. 2 is a diagram showin a portion of a picture screen which is.divided into blocks, each consisting of three picture elements in the horizontal direction and three lines in the vertical direction.
Figure 3:
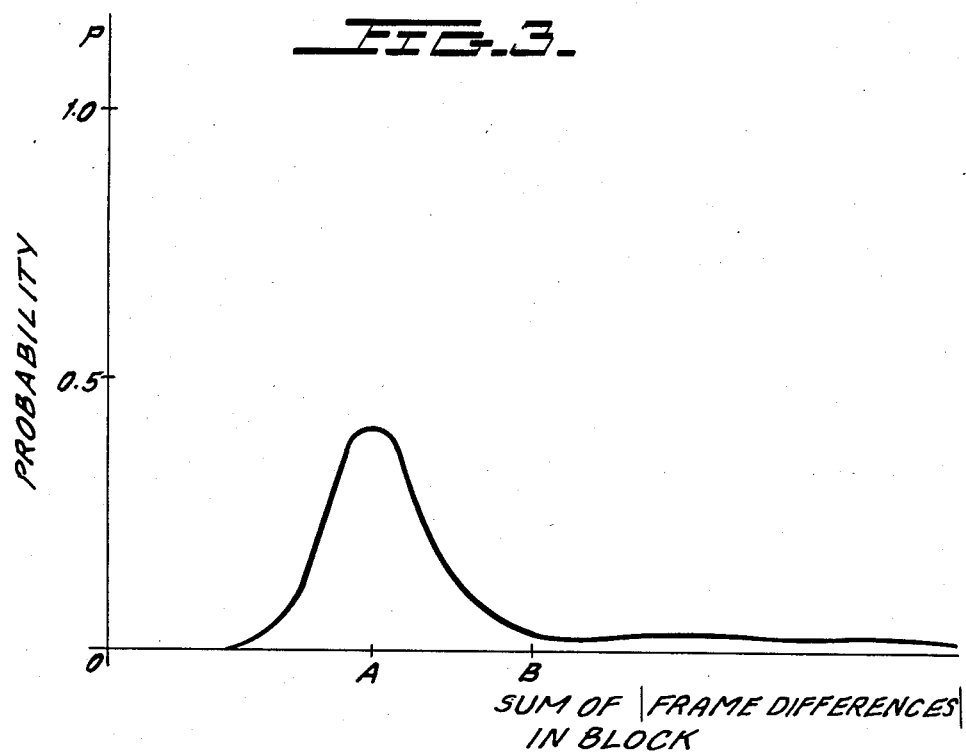
FIG. 3 is a diagram showing a relationship between the sum of absolute values of frame differences in each block versus the probability of that sum occurring.

FIG. 2 is a diagram in which the picture screen is divided into blocks each consisting of three picture elements and three lines, wherein Fi, j represents a frame difference of a picture element (i, j). If $$F = \sum_{k=0}^{2} \sum_{l=0}^{2} |Fi + k, j + l|$$

is calculated for each of the blocks in the picture screen, the appearing probability, in many cases, has a peak as indicated by A in FIG. 3. The peak value A represents a value that is obtained by integrating an average level of all the frame differences caused by noise in the block. When there is no motion, the peak value A assumes nearly a constant value. When the block contains motion, the frame difference derived from change of a brightness level caused by motion is added to the constant value. Therefore, if a certain threshold value (B in FIG. 3) is selected and the sum of absolute values of frame differences is compared with the value B, each block can be discriminated as being either a moving region or a stationary region. In the present invention, a primary step is the obtaining of this discrimination result.

Next, the discrimination result is stored over several lines or during a plurality of frames in order to correct errors in the primary discrimination result. That is, the invention involves correlating the discrimination result, either spatially, with respect to the neighboring blocks; or over time, with respect to the discrimination result of a given block for several frame periods. The disclosed embodiments are adaptable to perform both forms of correlation. That is, even when it is initially decided that one block to which attention is given is a stationary block, this block is nevertheless regarded as a moving block if most of the surrounding blocks are moving blocks. Conversely, when only one block is an isolated moving block, i.e., when the surrounding blocks are all stationary blocks, this block is regarded as a stationary block.

In time correlation, an isolated stationary block may be regarded as a stationary block only when the primary discrimination result indicating that it is a stationary block continues consecutively for a period of a plurality of frames.

Such correction processes bridge the moving regions and, conversely, bridge the stationary regions. In practice, since moving regions do not normally exist vermicularly, i.e., in the form of very fine points or lines, on the picture screen, this correction is a reasonable procedure to follow. In compressively encoding, in response to moving/stationary region information, sub-sampling (adaptive sub-sampling) for the moving region may be executed, or adaptive quantization wherein a different quantization characteristic is employed for the stationary region, may be effected. In this case, if fine moving regions exist, a region where sub-sampling is applied and a region where sampling is applied appear in rapid succession, or regions where respective different quantization characteristics are applied appear in rapid succession. Such a rapid alternative switching operation considerably degrades the visual characteristics of the picture. However, if the disconnected moving regions are bridged to form a mass region, such visual deterioration is reduced greatly.

A method in which the absolute values of the frame differences are added with respect to each block has just been explained. It is, however, also possible to discriminate a moving region from a stationary region by another method in which all significant picture elements that is, elements having an absolute value of the frame difference that is greater than a threshold value, are determined and the number of such significant picture elements in the block is counted. Some of the significant picture elements may be caused by noise. However, if the block is sufficiently large, the number of significant picture elements caused by noise is about constant. Therefore, the moving and stationary regions can be discriminated relying upon this latter principle as well as the first-mentioned method.

A first embodiment of the present invention, in which the absolute values of the frame differences are added block-by-block, will be described below with reference to FIG. 4. In this figure, a digital video signal is supplied through a line 1000 to a frame memory 10 and a subtractor 11. The substractor 11 delivers a frame difference signal by taking the difference between an input video signal supplied through a line 1111 and a delayed video signal supplied through a line 1011, and sends the result to an absolute value calculator 12, which calculates an absolute value of the frame difference and sends the absolute value to a line memory 13. The line memory 13 has a capacity for storing the absolute value of a number of lines that correspond to the size of the block in the vertical direction. An in-block adding circuit 14 reads absolute values of frame differences stored in the line memory 13, and calculates the sum thereof in the block. A comparator 15 compares the sum delivered from the in-block adding circuit 14 with a predetermined threshold value and sends the comparison result to a memory 22 as a first discriminated result, which will be referred to hereinafter as first moving/stationary region information.

The memory 22 stores the first moving/stationary region information of all blocks during a predetermined time period (such as one frame period or several frame periods). Thus the memory 22 is adaptable to store data for performing either spatial or time correlation. A decision circuit 23 reads out the first moving/stationary region information from the memory 22 and for each block performs a compensation of the first moving/stationary region information. Said compensation may be either time correlation, in accordance with the transition over time of this information, or spatial correlation in accordance with other first moving/stationary region information of the surrounding blocks. Each of the disclosed embodiments is to be understood to be adaptable to either spatial correlation or time correlation.

The decision circuit 23 sends the compensated final moving/stationary region information to a quantizer 18. The method of compensation of the first moving/stationary region information by the decision circuit will be described below in greater detail. It operates in the following general way. Let it be assumed that attention is given to one single block (referred to as the attention block) which is located at a certain position on the picture screen, and that a moving object in the picture traverses the position of the attention block. In this case, the attention block initially is "stationary", becomes "moving" for a while, and then returns again to "stationary". Unless the moving object is very small or unless the moving object moves at a very high speed, the "moving" and "stationary" conditions do not switch in each frame. Further, assuming the moving object is larger than one block, the "moving" station does not appear independently in one block surrounded by stationary blocks. Therefore, when the attention block becomes "moving" for one frame only, or when the surrounding blocks are all "stationary", the status of the attention block is changed into "stationary". Further, when the attention block is "stationary" but there are, for example, six or more "moving" blocks among the eight surrounding blocks, a attention block is regarded as the moving block.

Referring again to FIG. 4, a delay circuit 16 delays the input video signal so that the final moving/stationary region information will coincide in time with the predictive encoding operation. The delayed input video signal is supplied to a subtractor 17. The subtractor 17 calculates a difference between the input video signal supplied through a line 1617 and a prediction signal supplied through a line 1917, and sends the difference to the quantizer 18 as a prediction error signal. The quantizer 18 quantizes the prediction error signal supplied through a line 1718 under the control of the final moving/stationary region information supplied through the line 2318, and sends the quantized output to a transmission line 2000 and to an adder 20.

An example of how these components function is as follows. When the moving/stationary region information indicates a stationary portion, the quantizer 18 expands a range (referred to as the dead zone) in which the quantized output becomes zero in order to suppress an amount of data caused by the noise. The adder 20 adds the quantized output supplied via a line 1820 and the prediction signal supplied via a line 1920 together to produce a local decoded signal, and sends it to a frame memory 19 which stores one frame of the local decoded signal. The frame memory supplies an output as the prediction signal to the subtractor 17 and to the adder 20.

A second embodiment of the present invention will be explained below with reference to FIG. 5. Here, the fundamental structure is the same as that of the first embodiment shown in FIG. 4, and generally only different portions will be described below. A frame difference delivered from the subtractor 11 is converted into an absolute value for each of picture elements by the absolute value calculator 12, and the absolute value is supplied to a comparator 21 which compares the absolute value with a predetermined threshold value. When the absolute value is larger than the threshold value, the comparator 21 delivers data (such as "1") representing a significant (moving) picture element and supplies it to a line memory 13'. Otherwise, the comparator 21 sends data such as "0" representing a stationary picture element to the line memory 13'. An in-block adding circuit 14' counts the number of the significant picture elements, i.e., the number of the code "1" in each of the blocks relying upon the data stored in the line memory 13'. A comparator 15' compares the number of significant picture elements in each block with a predetermined threshold value and produces the first moving/stationary region information and sends it to the memory 22. Other parts of FIG. 5 are analogous to those of FIG. 4.

A specific example of a decision circuit 23 shown in FIGS. 4 and 5 which is adapted for spatial correlation will now be described in detail. In FIG. 6(a), the attention block is denoted by $A_0$, and the surrounding eight blocks are denoted by $A_1$ to $A_8$. In this case, $A_0$ to $A_8$ represent the first moving/stationary region information that are stored in the memory 22. FIGS. 6(b) and 6(c) show examples of FIG. 6(a), where "0" represents "stationary", and "1" represents "moving". In FIG. 6(b), the attention block $A_0$ is stationary and six blocks of $A_1$ to $A_6$ are moving. In FIG. 6(c), the attention block $A_0$ is moving and the eight surrounding blocks are all stationary.

Figure 4:
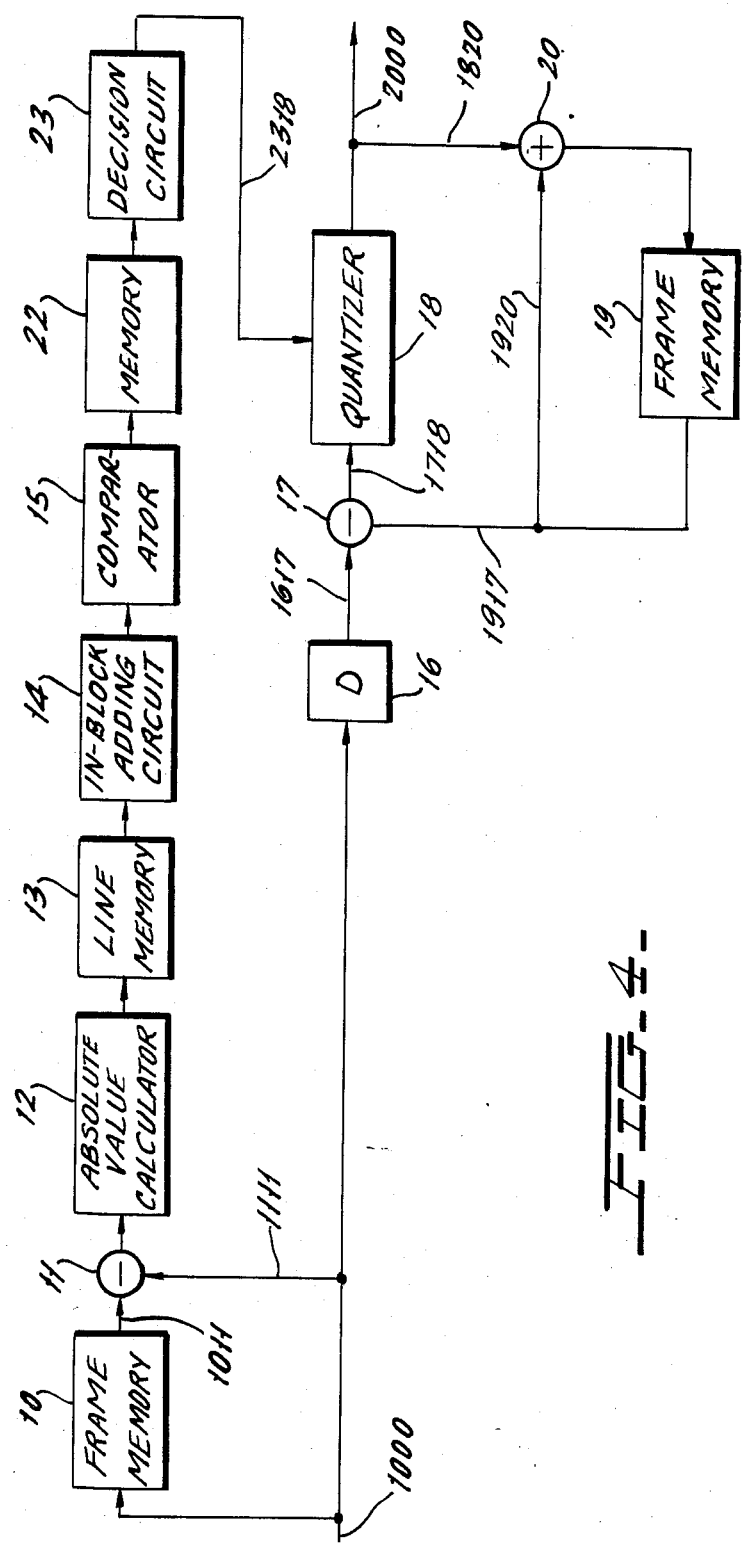
FIG. 4 is a block diagram showing a first embodiment of the present invention.
Figure 5:
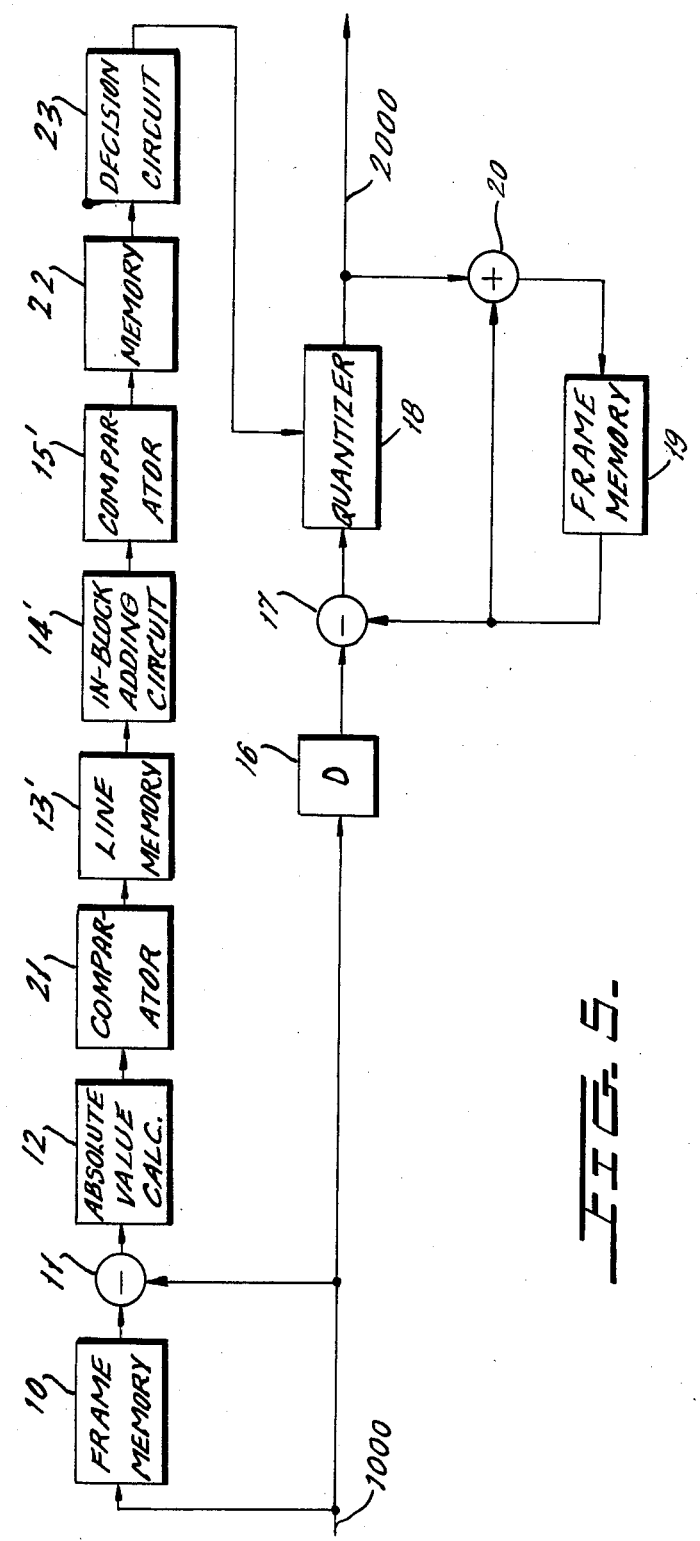
FIG. 5 is a block diagram showing a second embodiment of the present invention.

FIG. 7 shows an example of the decision circuit 23 shown in FIGS. 4 and 5 which may be realized by a read only memory (ROM). In FIG. 7, $A_0$ to $A_8$ corresponds to the moving/stationary region information shown in FIG. 6(a) and denote address inputs of the ROM. Further, OUT denotes an output of the ROM. Therefore, $P_1$ in FIG. 7 corresponds to FIG. 6(b), and $P_2$ of FIG. 7 corresponds to FIG. 6(c). As shown in FIG. 7, if more than six surrounding blocks are moving, the attention block is considered to be "moving" even when it is stationary. Conversely, when the surrounding blocks are all stationary, the moving attention block is considered to be stationary ("0").

In the first and second described aforementioned above, a first evaluation value for the attention block, which is computed from the frame differences, for example, the sum of the absolute values of the frame differences output by the in-block adding circuit 14, is compensated by the comparator 15 and the decision circuit 23 in accordance with other first evaluation values of the surrounding blocks to produce final moving/stationary region information.

According to third and fourth embodiments which will be described below, the first evaluation values of the attention block and the surrounding blocks are weighted by predetermined weighting factors and these weighted evaluation values are added with each other to produce a second evaluation value for the attention block. Then, the second evaluation value is compared with a threshold value to produce a final moving/stationary region inforamtion. In the following description, the sum of the absolute values of the frame differences in one block is used for the first evaluation value. The following description deals with only a process after the first evaluation value is computed.

The second evaluation value may be produced from the first evaluation values of blocks close to the attention block either in time sequence or in space. Let it be assumed that the first evaluation value of the attention block and the second evaluation value are denoted by $X_i$ and $Y_i$, respectively, and a first evaluation value of a block, which is spatially separated by k blocks from the attention block or which is separately by k frames in time, is denoted by $X_{i-k}$. Then, the second evaluation value of the attention block is computed according to following equations, $$Y_i = \left( \sum_{l=-k}^{k} a_l x_{i+l} \right) / \sum_{l=-k}^{k} a_l \quad (1)$$

where $a_l$ is the weighting factor, $$Y_i = b x_i + b^2 x_{i-1} + b^3 x_{i-2} + \ldots \quad (2)$$

where $|b| < 1$,

The second evaluation value thus obtained is compared with the predetermined threshold value. When the second evaluation value is greater than the threshold value, it is determined that the attention block exists in the moving region. When the second evaluation value is not greater than the threshold value, it is decided that the attention block exists in the stationary region.

In this process, the step for converting the first evaluation value into the second evaluation value corresponds to a process for bridging moving regions or, conversely, for bridging stationary regions. FIG. 8 shows an example of the first evaluation values of blocks on the picture screen. If these evaluation values are compared with the threshold value ("200" in this case) to separate the moving and stationary regions, three isolated stationary regions appear in the moving regions as shown in FIG. 8. FIG. 9 shows an example of the second evaluation values which are produced by weighting the first evaluation values of each attention block according to the blocks on the right and left by the weighting factors, 2,1 and 1 i.e., k—1, $a_{-1}=1$, $a_0=2$, and $a_1=1$ in the equation (1). When the thus produced second evaluation value is compared with the threshold value "200" to separate the moving region from the stationary region in the same manner as in FIG. 8, the isolated blocks shown in FIG. 8 are eliminated.

This is a reasonable process since small isolated moving regions do not exist in practice. In compressive encoding, the sub-sampling (adaptive sub-sampling) for the moving region or the adaptive quantization may be executed for the stationary region by utilizing the moving/stationary region information. In this case, if isolated moving regions exist, the sub-sampling and the normal sampling, or different quantization characteristics are switched over frequently and this impairs the visual quality of the picture. However, if the moving regions are bridged to form a mass as shown in FIG. 9, the degree of the visual damage is reduced greatly.

The third embodiment will be described below in conjunction with FIG. 10, wherein an input video signal supplied through a line 1000 is delayed by a frame memory 10, and a frame difference is delivered from a subtractor 11. The frame difference is sent to an in-block adding circuit 24 which includes an absolute value calculator, a line memory and an adder. Thereby, the in-block adding circuit computes a sum of absolute values of frame differences of picture elements in one block, and sends the sum as the first evaluation value to a multiplier $25_{-1}$ and to a series of delay circuits $26_{-1}$ to $26_{-4}$. Alternatively, it would be possible for the in-block adding circuit 24 include an absolute value calculator, a comparator, a line memory and an adder, in which case it would count the number of significant picture elements in each block. In the alternative case, the number of the significant picture elements in each block would be used as the first evaluation value.

Referring again to FIG. 10, the delay circuits 26 delay the first evaluation value by a time corresponding to the data output for one block from circuit 24 in the case of spatial correlation, or by a time of one frame in the case of time correlation. In this embodiment, the first evaluation value is sequentially delayed by times of one to four blocks or by times of one to four frames, and respective delayed evaluation values are sent to multipliers $25_{-2}$, $25_{-3}$, $25_{-4}$ and $25_{-5}$. The multipliers 25 multiply the first evaluation value and the respective delayed evaluation values by predetermined weighting factors ($a_2$, $a_1$, $a_0$, $a_{-1}$, $a_{-2}$), and send respective weighted values to an adder 27. The adder 27 adds up the respective weighted values, and sends an added value to a comparator 28 as the second evaluation value. The comparator 28 compares the second evaluation value with a predetermined threshold value. When the second evaluation value is greater than the threshold value, the comparator 28 delivers an output such as "1" indicating the moving region, or, otherwise, "0" indicating the stationary region, to an interpolation circuit 29 and to a compressive encoding circuit 30 as the moving/stationary region information. A delay circuit 16 delays the input video signal by a time equal to the time required for producing the moving/stationary region information, and sends the delayed video signal to a subtractor 17. The subtractor 17 subtracts a prediction signal delivered from a frame memory 19, from the delayed video signal, and delivers an interframe prediction error signal to a quantizer 18. The quantizer 18 quantizes the prediction error signal and sends the quantized prediction error signal to the compressive encoding circuit 30 and to a adder 20. The adder 20 adds the quantized prediction error signal and the prediction signal from the frame memory 19 together to deliver the local decoded signal to the interpolation circuit 29.

When the output of the comparator 28 is "0", i.e., stationary", the interpolation circuit 29 sends the local decoded signal from the adder 20 to the frame memory 19. When the output of the comparator 28 is "1", i.e., "moving", sub-sampling is performed and the interpolation circuit 29 produces video signals of picture elements, which are thinned out by the sub-sampling, by interpolation. Thereby, the interpolation circuit 29 builds up the local decoded signal and supplies it to the frame memory 19. The frame memory 19 stores the local decoded signal for one frame period, and sends the delayed local decoded signal to the subtractor 17 and to the adder 20. The compressive encoding circuit 30 converts the quantized predicted error signal supplied from the quantizer 18 into, for example, a Hoffman code. When the comparator 28 delivers "1", corresponding to sub-sampling, the compressive encoding circuit 30 thins out one sample for two samples in the quantized predicted error signal and sends thinned output to an output terminal 2000.

Figure 10:
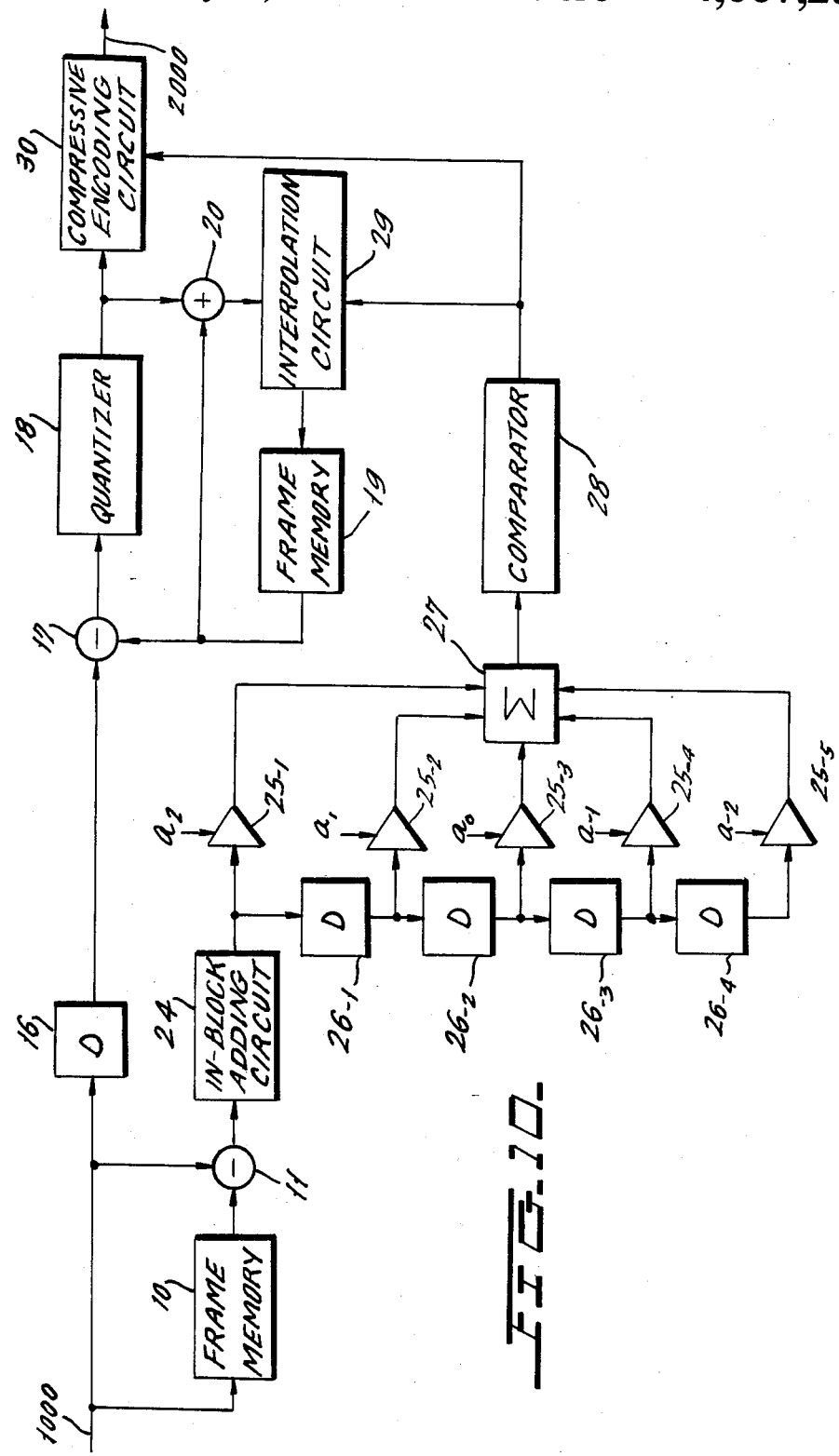
FIG. 10 is a diagram showing a third embodiment of the present invention.
Figure 11:
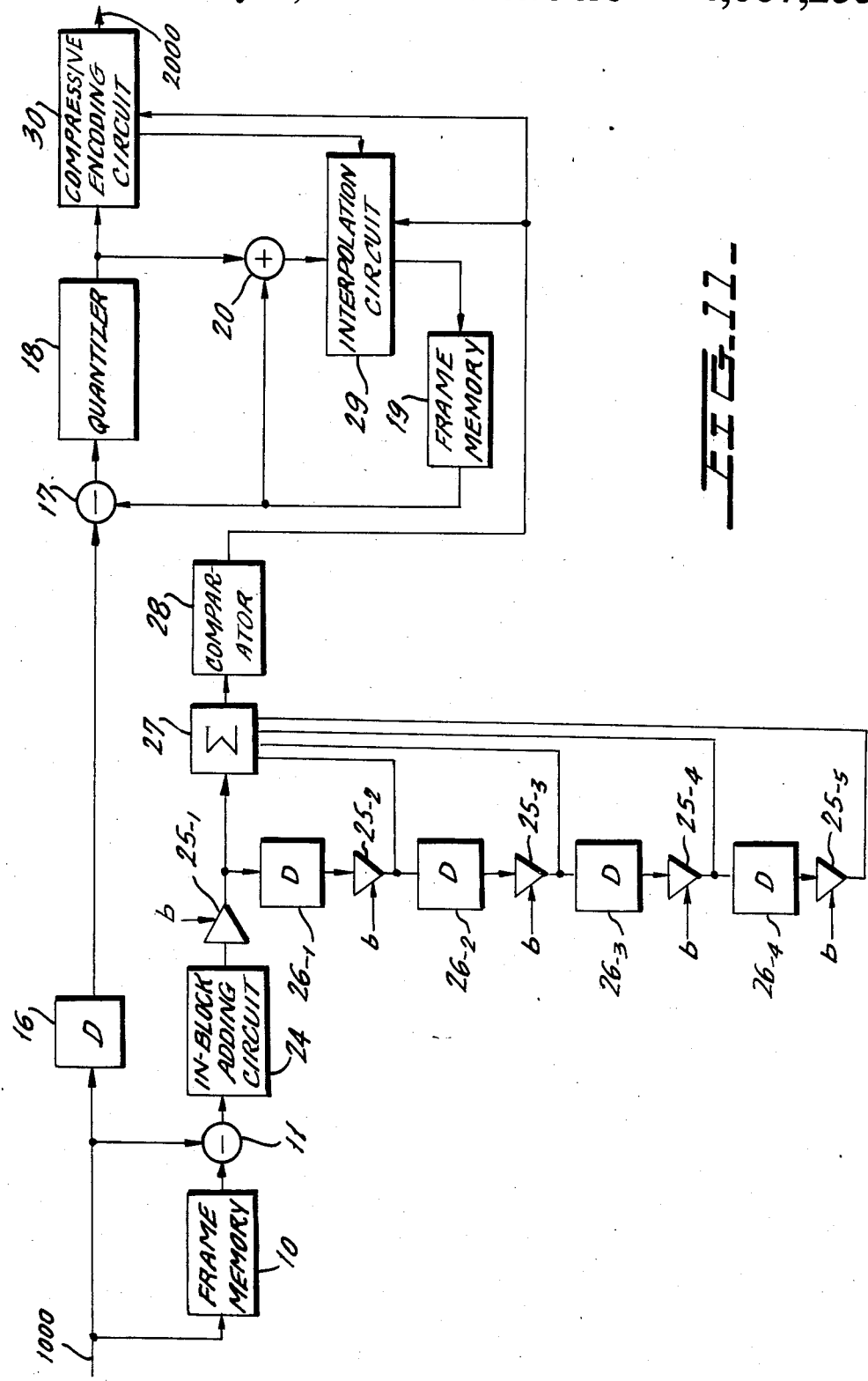
FIG. 11 is a diagram showing a fourth embodiment of the present invention.

FIG. 11 shows a fourth embodiment of the present invention which is generally the same as the third embodiment of FIG. 10, except for the portion for obtaining a second evaluation value from the first evaluation values. Therefore, only the different portion will be described below. The first evaluation value produced by the in-block adding circuit 24 is multiplied by a weighting factor b by a multiplier $25_{-1}$. The weighted value is sent to series of delay circuits $26_{-1}$ to $26_{-4}$ and to an adder 27. Each of the delay circuits 26 delays the input signal by a time corresponding to one block or by a time of one frame. Therefore, the first evaluation value is sequentially multiplied by respective weighting factors at every step and respective weighted values are sent to the adder 27. The adder adds respective weighted values and sends the added result to the comparator 28 as the second evaluation value. Otherwise FIG. 11 is the same as FIG. 10.

In the present invention, the frame memory 10 shown in the embodiments can also be changed as a field memory. In this case, however, a certain constant field difference signal would be delivered necessarily even for a stationary picture due to interlace scanning. Therefore, a high threshold value must be set to cope with the sum of absolute values of field differences or to cope with absolute values of field differences that determine significant picture elements.

According to the present invention as described above, erroneous discrimination of moving and stationary regions caused by the noise is effectively reduced. Further, when the moving/stationary discrimination result obtained by the present invention is used for a compressive encoding apparatus for a video signal, a good efficiency can be derived from the compressive encoding apparatus.

What is claimed is:

1. An apparatus for discriminating a moving region and a stationary region in an input video signal which is divided into time frames, each time frame including a plurality of time fields, and spatially divided into a plurality of picture elements, a plurality of mutually adjacent blocks of picture elements being defined therein, comprising:

means for storing said input video signal for at least one field to deliver a delayed video signal;
means for extracting an amplitude difference for each of said picture elements between said delayed video signal and said input video signal;
means for summing the extracted amplitude differences for the picture elements belonging to each of a plurality of blocks to deliver a first evaluation value for each of said plurality of blocks;
means for comparing said first evaluation value with a predetermined value to deliver a first moving/stationary region signal for each block of said plurality of blocks; and
means for compensating said first moving/stationary region siganl for said each block in response to at least one other first moving/stationary region signal corresponding to a block adjacent to said each block to deliver a final moving/stationary region signal as an output of said apparatus.

2. An apparatus for discriminating a moving region and a stationary region in an input video signal which is divided into time frames, each time frame including a plurality of time fields, and spatially divided into a plurality of picture elements, a plurality of mutually adjacent blocks of picture elements being defined therein, comprising:

means for storing said input video signal for at least one field to deliver a delayed video signal;
means for extracting an amplitude difference for each of said picture elements between said delayed video signal and said input video signal;
means for summing the extracted amplitude differences for the picture elements belonging to each of a plurality of blocks to deliver a first evaluation value for each of said plurality of blocks;
means for comparing said first evaluation value with a predetermined value to deliver a first moving/stationary region signal for each block of said plurality of blocks; and
means for compensating said first moving/stationary region signal for said each block in response to at least one previous said first moving/stationary region signal for the same block to deliver a final moving/stationary region signal as an output of said apparatus.

3. An apparatus for discriminating a moving region and a stationary region in an input video signal which is divided into time frames, each time frame including a plurality of time fields, and spatially divided into a plurality of picture elements, a plurality of mutually adjacent blocks of picture elements being defined therein, comprising:

means for storing said input video signal for at least one field to deliver a delayed video signal;
means for determining an amplitude difference for each of said picture elements between said delayed video signal and said input video signal;
first comparing means for comparing said amplitude difference with a first predetermined value to deliver a significance signal for each of said picture elements when said amplitude difference is greater than said first predetermined value;
means for counting the number of significance signals for the picture elements belonging to each of said plurality of blocks;
second comparing means for comparing said number of said significance signals with a second predetermined value to deliver a first moving/stationary region signal for each block of said plurality of blocks; and
means for compensating said first moving/stationary region signal for said each block in response to at least one other first moving/stationary region signal corresponding to a block adjacent to said each block to deliver a final moving/stationary region signal as an output of said apparatus.

4. An apparatus for discriminating a moving region and a stationary region in an input video signal which is divided into time frames, each time frame including a plurality of time fields, and spatially divided into a plurality of picture elements, a plurality of mutually adjacent blocks of picture elements being defined therein, comprising:

means for storing said input video signal for at least one field to deliver a delayed video signal;

means for determining an amplitude difference for each of said picture elements between said delayed video signal and said input video signal;

first comparing means for comparing said amplitude difference with a first predetermined value to deliver a significance signal for each of said picture elements when said amplitude difference is greater than said first predetermined value;

means for counting the number of significance signals for the picture elements belonging to each of said plurality of blocks;

second comparing means for comparing said number of said significance signals with a second predetermined value to deliver a first moving/stationary region signal for each block of said plurality of blocks; and means for compensating said first moving/stationary region signal for said each block in response to at least one previous said first moving/stationary region signal for the same block to deliver a final moving/stationary region signal as an output of said apparatus.

5. An apparatus for discriminating a moving region and a stationary region in an input video signal which is divided into time frames, each time frame including a plurality of time fields, and spatially divided into a plurality of picture elements, a plurality of mutually adjacent blocks of picture elements being defined therein, comprising:

means for storing said input video signal for at least one field to deliver a delayed video signal;

means for extracting an amplitude difference for each of said picture elements between said delayed video signal and said input video signal;

means for summing the extracted amplitude differences for the picture elements belonging to each of a plurality of blocks to deliver a first evaluation value for each block;

means for weighting said first evaluation value for each block and other said first evaluation values for blocks adjacent to said each block by respective predetermined weighting factors and for summing said weighted first evaluation values to produce a second evaluation value; and means for comparing said second evaluation value with a predetermined value to deliver a moving/stationary region signal as an output of said apparatus.

6. An apparatus for discriminating a moving region and a stationary region in an input video signal which is divided into time frames, each time frame including a plurality of time fields, and spatially divided into a plurality of picture elements, a plurality of mutually adjacent blocks of picture elements being defined therein, comprising:

means for storing said input video signal for at least one field to deliver a delayed video signal;

means for determining an amplitude difference for each of said picture elements between said delayed video signal and said input video signal;

first comparing means for comparing said amplitude difference with a first predetermined value to deliver a significance signal for each of said picture elements when said amplitude difference is greater than said first predetermined value;

means for counting the number of significance signals for the picture elements belonging to each of said plurality of blocks to deliver a first evaluation value;

means for weighting said first evaluation value for each block and other said first evaluation values for blocks adjacent to said each block by respective predetermined weighting factors and for summing said weighted first evaluation values to produce a second evaluation value; and second comparing means for comparing said second evaluation value with a second predetermined value to deliver a moving/stationary region signal as an output of said apparatus.

7. An apparatus for discriminating a moving region and a stationary region in an input video signal which is divided into time frames, each time frame including a plurality of time fields, and spatially divided into a plurality of picture elements, a plurality of mutually adjacent blocks of picture elements being defined therein, comprising:

means for storing said input video signal for at least one field to deliver a delayed video signal;

means for extracting an amplitude difference for each of said picture elements between said delayed video signal and said input video signal;

means for summing the extracted amplitude differences for the picture elements belonging to each of a plurality of blocks to deliver at a given time a first evaluation value for each of said plurality of blocks;

means for weighting said first evaluation value for each block by weighting a plurality of said first evaluation values for said each block delivered at other times than said given time by respective weighting factors and by summing said weighted first evaluation values to produce a second evaluation value; and means for comparing said second evaluation value with a predetermined value to deliver a moving/stationary region signal as an output of said apparatus.

8. An apparatus for discriminating a moving region and a stationary region in an input video signal which is divided into time frames, each time frame including a plurality of time fields, and spatially divided into a plurality of picture elements, a plurality of mutually adjacent blocks of picture elements being defined therein, comprising:

means for storing said input video signal for at least one field to deliver a delayed video signal;

means for determining an amplitude difference for each of said picture elements between said delayed video signal and said input video signal;

first comparing means for comparing said amplitude difference with a first predetermined value to deliver a significance signal for each of said picture elements when said amplitude difference is greater than said first predetermined value;

means for counting the number of significance signals for the picture elements belonging to each of said plurality of blocks to deliver a first evaluation value at a given time;

means for weighting said first evaluation value for each block by weighting a plurality of said first evaluation values for said each block delivered at times other than said given time by respective weighting factors and by summing said weighted first evaluation values to produce a second evaluation value; and second comparing means for comparing said second evaluation value with a second predetermined value to deliver a moving/stationary region signal as an output of said apparatus.

9. An apparatus for discriminating a moving region and a stationary region in an input video signal which is divided into time frames, each time frame including a plurality of time fields, and spatially divided into a plurality of picture elements, a plurality of mutually adjacent blocks of picture elements being defined therein, comprising:

means for delaying said input video signal by at least one field period to deliver a delayed video signal;

means for calculating an amplitude difference for each picture element by subtracting said delayed video signal from said input video signal;

means for computing a first value for each of said blocks in response to said amplitude differences for each picture element contained in each respective block; and means for determining whether each block is a moving region or a stationary region by taking a correlation of said first values for blocks adjacent to said block to deliver a second value indicating whether said block is a moving region or a stationary region.

10. An apparatus for discriminating a moving region and a stationary region in an input video signal which is divided into time frames, each time frame including a plurality of time fields, and spatially divided into a plurality of picture elements, a plurality of mutually adjacent blocks of picture elements being defined therein, comprising:

means for delaying said input video signal by at least one field period to deliver a delayed video signal;

means for calculating an amplitude difference for each picture element by subtracting said delayed video signal from said input video signal;

means for computing a first value for each of said blocks in response to said amplitude differences for each picture element contained in each respective block; and means for determining whether each block is a moving region or a stationary region by taking a time transition correlation of said first value of said block to deliver a second value indicating whether said block is a moving region or a stationary region.

* * * * *